United States Patent
Lee et al.

(10) Patent No.: US 8,550,417 B2
(45) Date of Patent: Oct. 8, 2013

(54) PIVOTING HOOK RETENTION SYSTEM

(75) Inventors: Joel R. Lee, Peotone, IL (US); Robert L. Charlton, Valparaiso, IN (US); Dion Harris, Homewood, IL (US)

(73) Assignee: Illinois Tool Works Inc., Glenview, IL (US)

( * ) Notice: Subject to any disclaimer, the term of this patent is extended or adjusted under 35 U.S.C. 154(b) by 185 days.

(21) Appl. No.: 13/263,447

(22) PCT Filed: Mar. 9, 2010

(86) PCT No.: PCT/US2010/026598
§ 371 (c)(1),
(2), (4) Date: Oct. 7, 2011

(87) PCT Pub. No.: WO2010/117531
PCT Pub. Date: Oct. 14, 2010

(65) Prior Publication Data
US 2012/0043363 A1   Feb. 23, 2012

Related U.S. Application Data

(60) Provisional application No. 61/167,670, filed on Apr. 8, 2009.

(51) Int. Cl.
*F16B 45/00*   (2006.01)

(52) U.S. Cl.
USPC ........... 248/304; 248/308; 248/339; 280/727; 280/728.3; 280/730.2

(58) Field of Classification Search
USPC .................... 248/304, 308, 339, 341, 340; 280/730.2, 728.3, 727
See application file for complete search history.

(56) References Cited

U.S. PATENT DOCUMENTS

| | | | | |
|---|---|---|---|---|
| 4,720,028 A | * | 1/1988 | Takemura et al. | 224/553 |
| 5,507,423 A | * | 4/1996 | Fischer et al. | 224/313 |
| 6,065,657 A | * | 5/2000 | Fischer | 224/313 |
| 6,663,067 B2 | * | 12/2003 | Gordon | 248/294.1 |
| 6,959,954 B2 | * | 11/2005 | Brandt et al. | 296/1.08 |
| 6,968,601 B2 | * | 11/2005 | Bivens et al. | 24/369 |
| 7,103,939 B2 | | 9/2006 | Belchine, III et al. | |
| 7,669,821 B2 | * | 3/2010 | Martin | 248/294.1 |
| 8,079,446 B2 | * | 12/2011 | Nemoto | 185/40 H |
| 8,240,625 B2 | * | 8/2012 | Kato | 248/304 |
| 2005/0076471 A1 | * | 4/2005 | Watanabe et al. | 16/66 |
| 2007/0084918 A1 | | 4/2007 | Tabet et al. | |
| 2007/0228702 A1 | | 10/2007 | Ono et al. | |

FOREIGN PATENT DOCUMENTS

DE   19913745 A1   10/2000

OTHER PUBLICATIONS

ISR for PCT/US2010/026598 dated Apr. 29, 2010.

* cited by examiner

*Primary Examiner* — Amy J Sterling
(74) *Attorney, Agent, or Firm* — Mark W. Croll; Paul F. Donovan

(57) ABSTRACT

A retaining system for an articulating support hook held in snap-in relation to a support surface underlying a vehicle headliner. The support hook assembly includes a hook member which is adapted to pivot between open and closed positions as desired. The hook assembly is stable in both the open and the closed positions and is not reliant upon internal springs for operation. The retaining system for the support hook assembly is not dependent upon screws or other attachment elements.

20 Claims, 7 Drawing Sheets

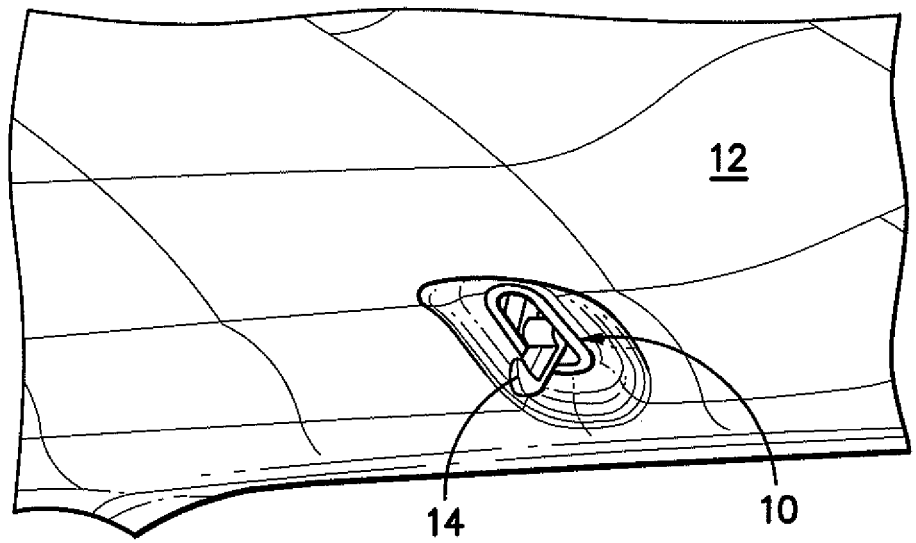
FIG. -1-
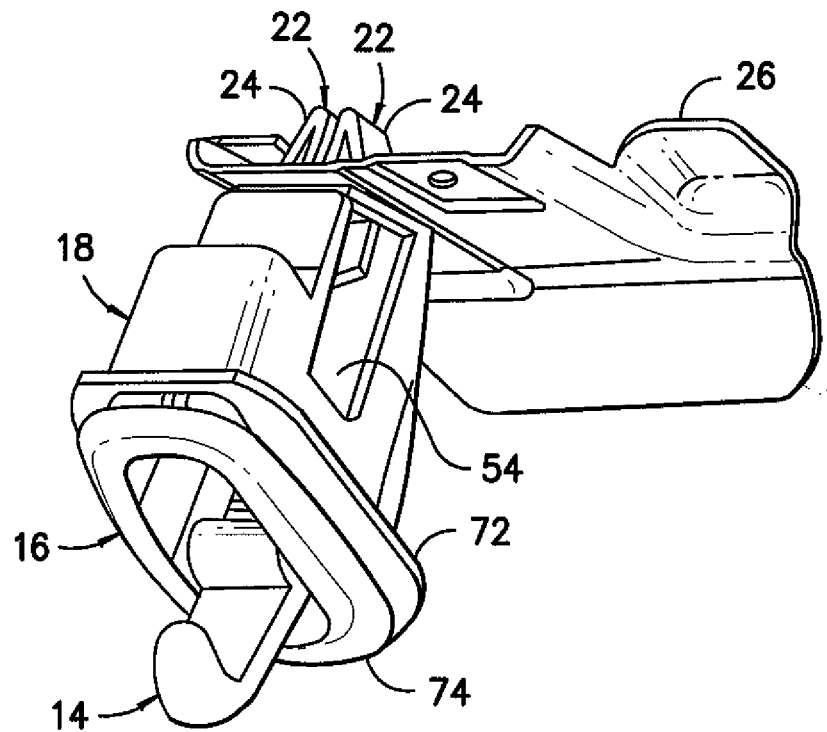
FIG. -2-

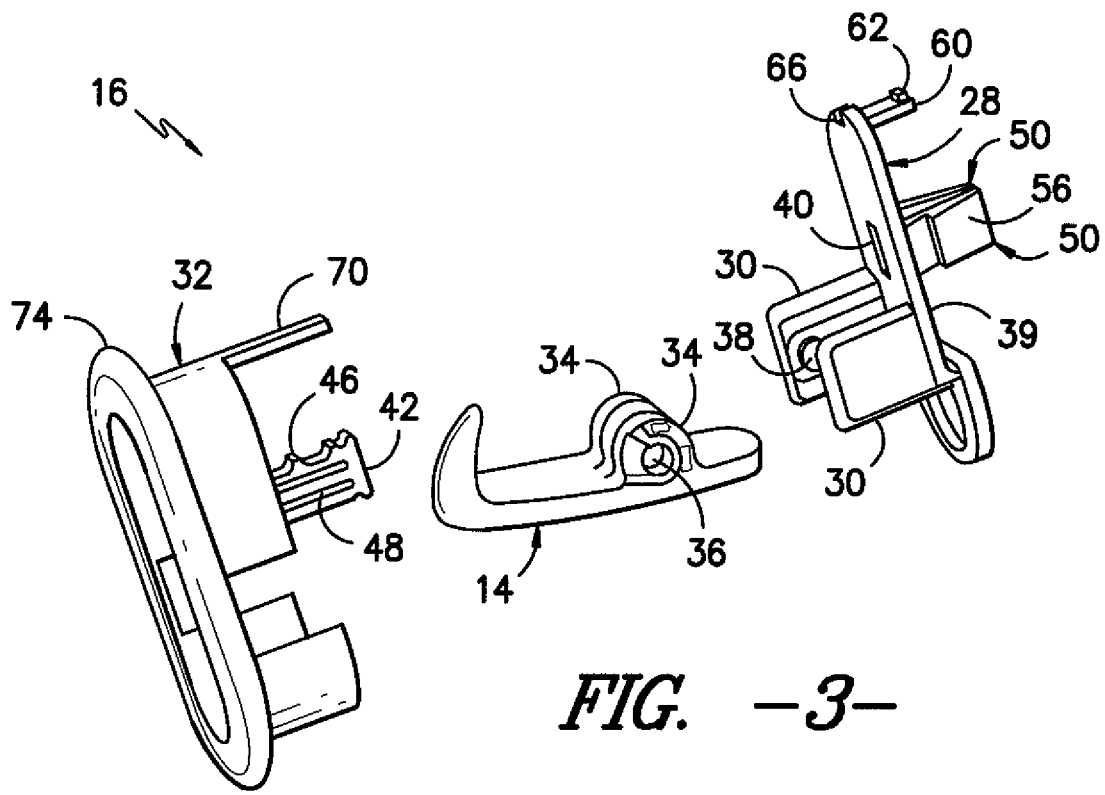
FIG. -3-
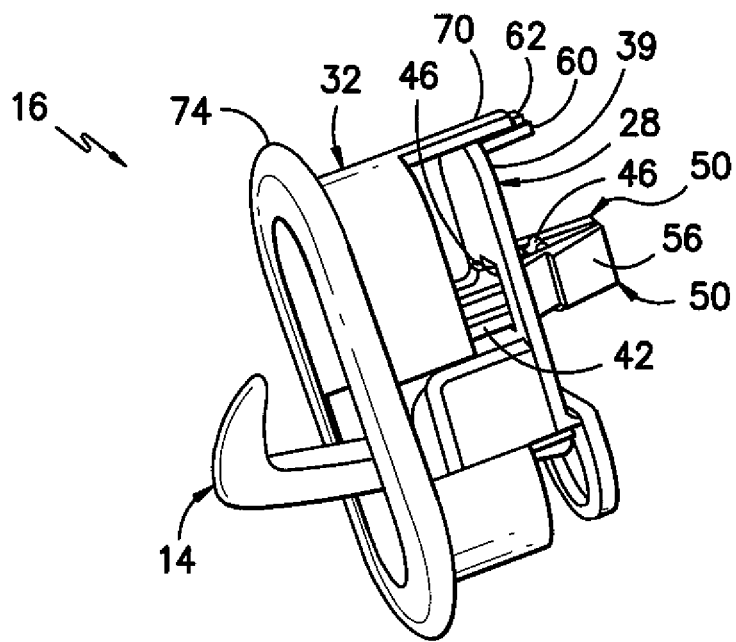
FIG. -4-

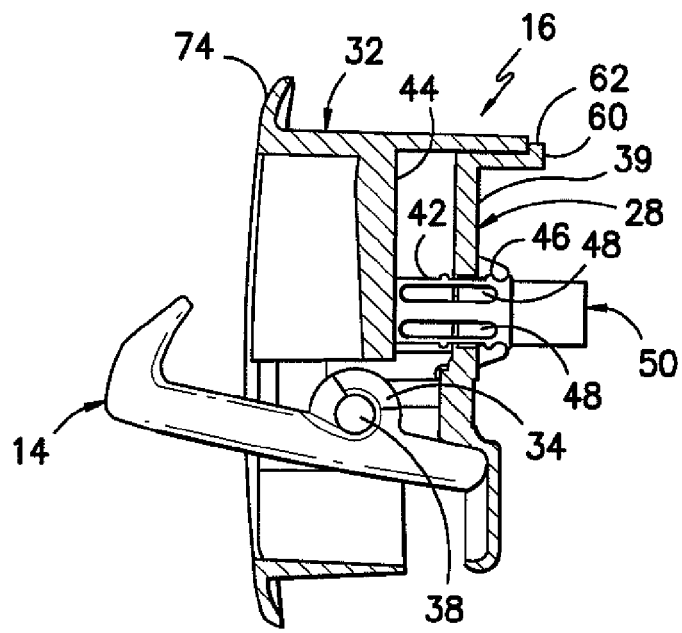
FIG. -5-
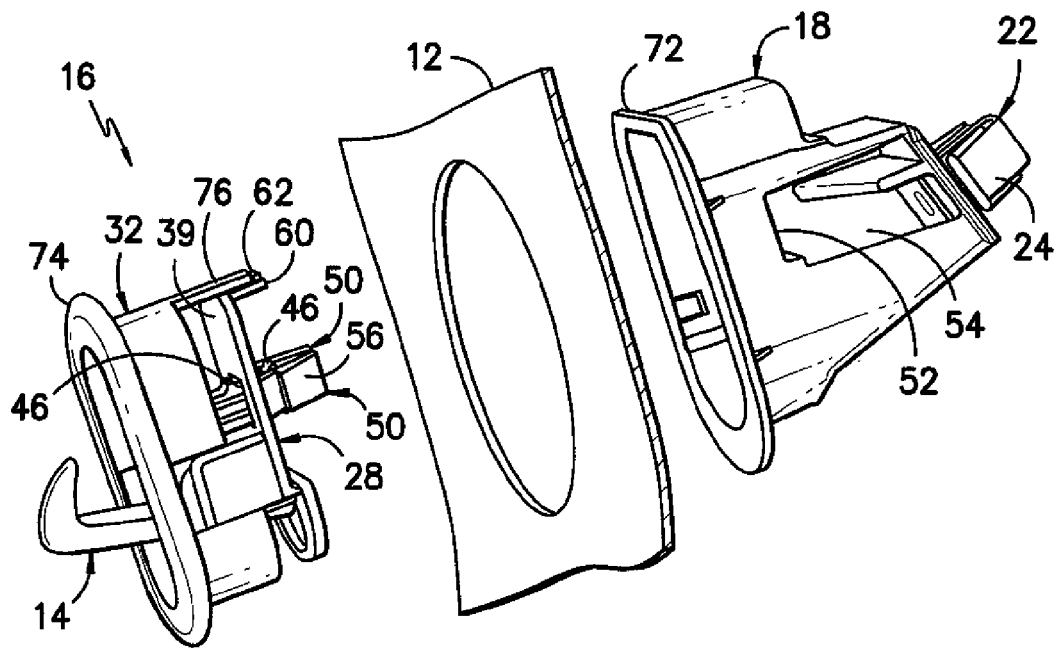
FIG. -6-

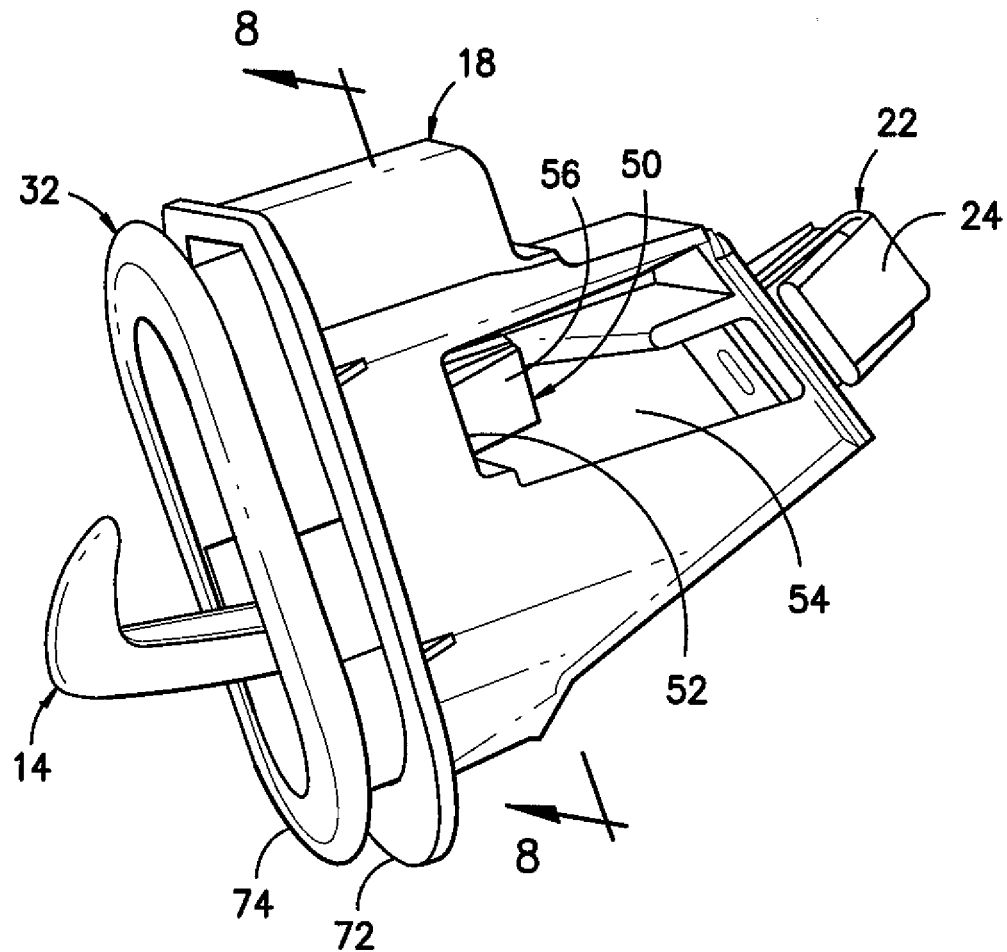
FIG. -7-

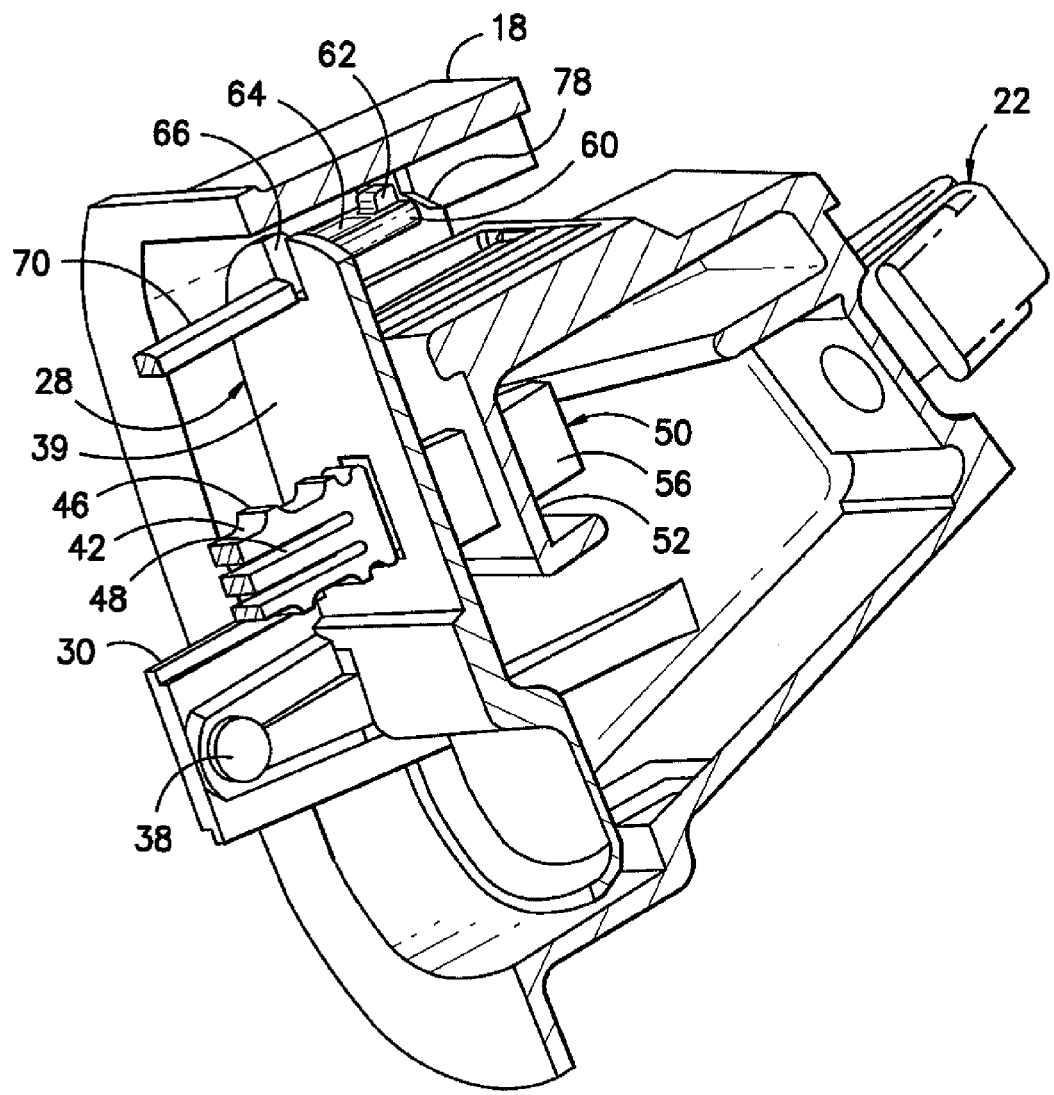
FIG. -8-

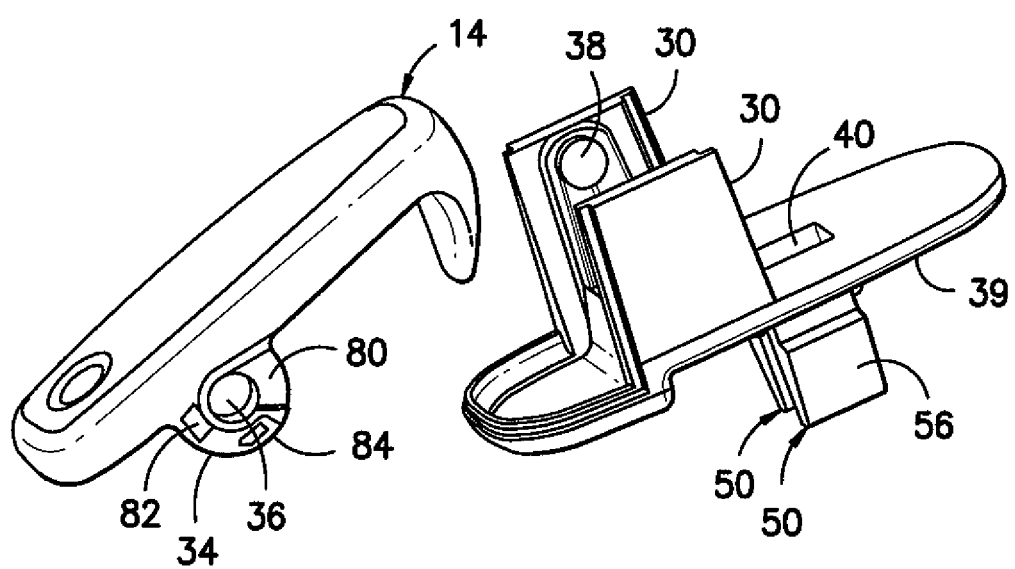
FIG. −9−

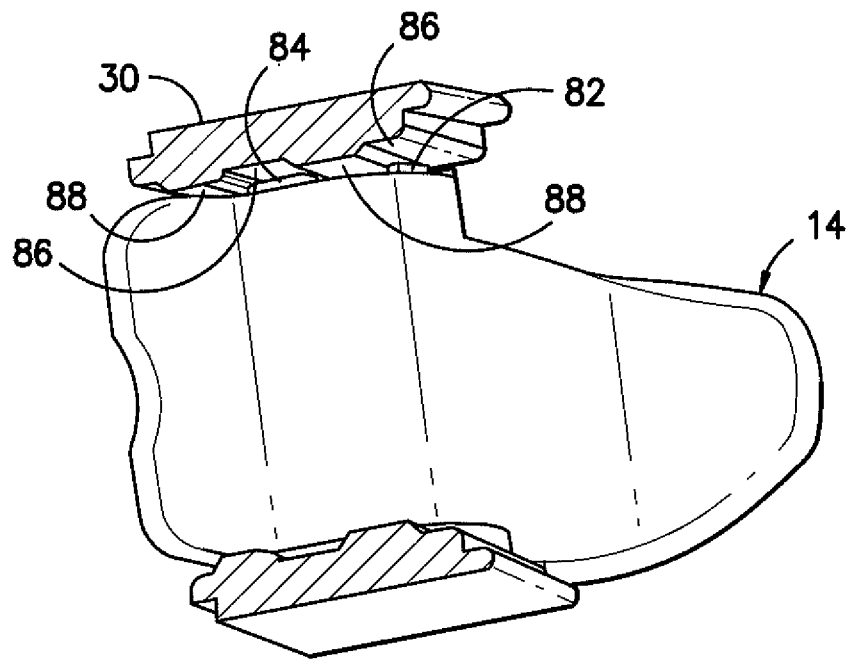
FIG. -10-
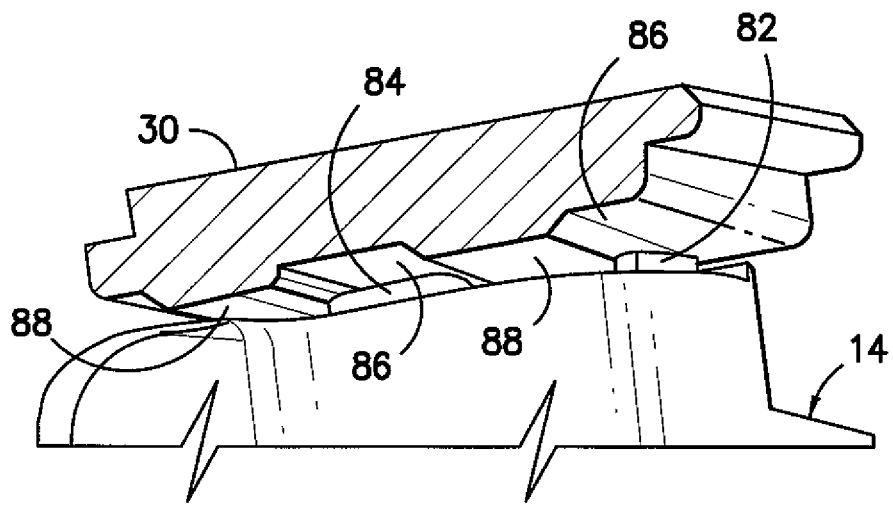
FIG. -11-

PIVOTING HOOK RETENTION SYSTEM

CROSS-REFERENCE TO RELATED APPLICATION

This application is national phase of PCT/US2010/026598 filed Mar. 9, 2010, and claims the benefit of U.S. Provisional Application Ser. No. 61/167,670, filed Apr. 8, 2009.

TECHNICAL FIELD

The present invention relates generally to a support hook assembly including an articulating support hook, and is more particularly directed to a support hook assembly adapted to provide snap-in attachment and retention of a hook module relative to an underlying support structure within a transportation vehicle or similar environment. The support hook assembly may be disposed within an opening in a headliner other trim element without the need for screws or other connection elements.

BACKGROUND OF THE INVENTION

In many environments of use it may be desirable for a user to have access to an outwardly projecting support hook to hang clothing, coats and other articles in an accessible yet out of the way position. It may also be desirable that the outwardly projecting support hook be moveable between and open and closed positions so as to project outwardly in an operative condition only when in use.

In a transportation vehicle environment, it may be desirable to locate a support hook at an elevated position relative to the occupants. In particular, it may be desirable to position such support hooks in the vicinity of the vehicle roof rail above a vehicle side panel. Most transportation vehicles incorporate a noise dampening headliner or other trim element disposed in surrounding relation to the elevated frame members. Accordingly, it is desirable for the retention system of any installed hook to readily accommodate the presence of such a headliner. In addition, it is generally desirable that the presence of the support hook avoid substantially interrupting the contour of the headliner.

In the past, support hooks have been installed using typical connection methods such as screws or the like which join the support hook to the underlying vehicle frame. However, such attachment systems require the use of assembly tools and may leave screws or other attachment elements visible thereby negatively impacting the aesthetic character within the vehicle. Accordingly, it would be beneficial to provide a support hook retention system which is not reliant upon fasteners or drivers for assembly and which provides minimal interruption to the headliner or other surrounding trim.

SUMMARY OF THE INVENTION

The present invention provides advantages and alternatives over the prior art by providing an articulating support hook assembly including a retainer system held in snap-in relation to the vehicle frame. The support hook assembly includes a hook member which is adapted to pivot between open and closed positions as desired. The hook assembly is stable in both the open and the closed positions and is not reliant upon internal springs for operation.

According to one aspect, the present invention provides a support hook retention system adapted for disposition in embedded relation within a vehicle headliner. The retention system includes a connection bracket including at least one outwardly projecting snap-fit connector adapted to lockingly engage a support structure at a position behind the headliner. The connection bracket has an acceptance opening facing outwardly away from the support structure. The acceptance opening defines an entranceway to an interior containment cavity. The retention system also includes a hook module including a forward portion adapted for disposition in front of the headliner and a rear portion of reduced diameter relative to the forward portion. The rear portion is adapted for mating insertion through an opening in the headliner and into the containment cavity. A hook element is held in pivoting relation to a backing structure. The backing structure includes at least one rearwardly projecting snap-fit male connector adapted to lockingly engage a ledge surface at the connection bracket rearward of the acceptance opening. The hook module further includes a shroud adapted for disposition at least partially about the hook element. The shroud includes a rearwardly projecting latching post adapted for staged insertion through a pass-through opening in a backing plate at the backing structure. The latching post includes a pattern of outwardly extending raised surfaces such that the latching post is insertable through the pass-through opening between a first latched condition wherein the backing plate is held in place at a first distance from the shroud to at least a second latched condition wherein the backing plate is held in place at a second distance closer to the shroud.

According to another aspect, the present invention provides a support hook retention system adapted for disposition in embedded relation within a vehicle headliner. The retention system includes a connection bracket having at least one outwardly projecting snap-fit connector adapted to lockingly engage a support structure at a position behind the headliner. The connection bracket includes an acceptance opening facing outwardly away from the support structure. The acceptance opening defines an entranceway to an interior containment cavity. The retention system further includes a hook module having a forward portion adapted for disposition in front of the headliner and a rear portion of reduced diameter relative to the forward portion. The rear portion is adapted for mating insertion through an opening in the headliner and into the containment cavity. The hook module includes a hook element held in pivoting relation to a backing structure. The backing structure includes at least one rearwardly projecting snap-fit male connector adapted to lockingly engage a ledge surface at the connection bracket rearward of the acceptance opening. The hook module further includes a shroud adapted for disposition at least partially about the hook element, the shroud including a rearwardly projecting latching post adapted for staged insertion through a pass-through opening in a backing plate at the backing structure. The latching post includes a pattern of outwardly extending raised surfaces such that the latching post is insertable through the pass-through opening between a first latched condition wherein the backing plate is held in place at a first distance from the shroud to at least a second latched condition wherein the backing plate is held in place at a second distance closer to the shroud.

According to yet a further aspect, the present invention provides a support hook retention system adapted for disposition in embedded relation within a vehicle headliner. The retention system includes a connection bracket having at least one outwardly projecting snap-fit connector adapted to lockingly engage a support structure at a position behind the headliner, the connection bracket has an acceptance opening facing outwardly away from the support structure. The acceptance opening defines an entranceway to an interior containment cavity. The retention system further includes a hook module including a forward portion adapted for disposition in front of the headliner and a rear portion of reduced diameter relative to the forward portion. The rear portion is adapted for mating insertion through an opening in the headliner and into the acceptance opening at the connection bracket for locking retention within the containment cavity. The hook module includes a hook element held in pivoting relation to a backing structure. The backing structure includes at least one rearwardly projecting snap-fit male connector adapted to lockingly engage a ledge surface at the connection bracket rearward of the acceptance opening upon insertion of the hook module. The hook module further includes a shroud disposed at least partially about the hook element. The shroud includes a rearwardly projecting latching post adapted for insertion through a pass-through opening in a backing plate at the backing structure. The latching post includes a plurality of outwardly extending ratchet teeth disposed along the length of the latching post and at least one compression slot disposed at the interior of the latching post, such that the latching post is insertable in compressible ratcheting relation through the pass-through opening between a first latched condition wherein the backing plate is held in place at a first distance from the shroud to at least a second latched condition wherein the backing plate is held in place at a second distance closer to the shroud. A spacing post including a distal step extends rearwardly away from the backing plate. A standoff post extends rearwardly from the shroud. The standoff post is disposed in juxtaposed relation to the spacing post with the distal step in blocking relation to a distal end of the standoff post when the latching post is at the first latched condition.

BRIEF DESCRIPTION OF THE DRAWINGS

FIG. 1 is a perspective view of an exemplary support hook assembly disposed at a vehicle roof within a surrounding headliner;

FIG. 2 is a view of the support hook assembly of FIG. 1 with the headliner removed;

FIG. 3 is an exploded view of a hook module sub-assembly;

FIG. 4 is an assembled view of the hook module sub-assembly illustrated in FIG. 3;

FIG. 5 is a cut-away view of the hook module sub-assembly illustrated in FIG. 4;

FIG. 6 is an exploded view illustrating the insertion of the hook module sub-assembly into an attachment bracket with the headliner disposed therebetween;

FIG. 7 is a perspective view illustrating the mating engagement of the articulating hook module sub-assembly with the attachment bracket;

FIG. 8 is a cut-away view taken generally through line 8-8 with the articulating hook removed;

FIG. 9 is an exploded view illustrating an exemplary hook pivot system;

FIG. 10 illustrates an exemplary locking system for holding the hook in a selected open or closed position; and FIG. 11 is an enhanced view of one side of the locking system illustrated in FIG. 10.

Before the embodiments of the invention are explained in detail, it is to be understood that the invention is not limited in its application to the details of construction and the arrangement of components set forth in the following description or illustrated in the drawings. Rather, the invention is capable of other embodiments and of being practiced or of being carried out in various ways. Also, it is to be understood that the phraseology and terminology used herein are for the purposes of description only and should not be regarded as limiting. Thus, the use of "including", "comprising", and variations thereof is meant to encompass the items listed and equivalents thereof, as well as additional items and equivalents thereof.

DETAILED DESCRIPTION OF THE PREFERRED EMBODIMENTS

Reference will now be made to the drawings, wherein to the extent possible, like elements are designated by like reference numerals throughout the various views. Referring now to FIG. 1, a support hook assembly 10 is shown in embedded relation within a headliner 12 or other trim element at the interior of a transportation vehicle such as an automobile, railroad car, airplane or the like. The support hook assembly 10 includes an articulating hook element 14 that is supported within a hook module 16 (FIGS. 3 and 4) as will be described further hereinafter. In operation, the hook element 14 may be rotated between the extended, open condition illustrated in FIGS. 1 and 2 and a stored, closed condition in which the hook element is folded into the cavity defined by the interior of the hook module 16. As will be appreciated, with the hook element 14 in the open condition, a user may hang a garment such as a coat or other item from the hook element 14. When the hook element 14 is no longer needed, it may be rotated to a stored condition at the interior of the hook module 16 such that it does not interrupt the profile of the headliner 12.

As best seen in FIG. 2, in the exemplary construction, the hook module 16 is held in snap-fit relation within the concave interior of a connection bracket designated generally as 18 such as a generally tetrahedral Z bracket or the like. The connection bracket may be formed from any suitable material including metal, polymers or the like. As shown, the connection bracket 18 includes a snap-fit tower connection incorporating a pair of opposing snap-fit insertion heads 22, that are adapted for insertion through an acceptance slot or other opening in a support structure 26 such as a portion of the vehicle frame. Specifically, each of the insertion heads 22 has a generally half arrowhead profile including a diverging, angled flexible wing segment 24. The wing segments 24 flex inwardly as the insertion heads 22 are inserted through the acceptance opening in the support structure. The wing segments 24 then snap behind the support structure once the insertion operation is complete. In this relation, the connection bracket 18 is secured in place relative to the support structure. Of course, virtually any other snap-in connection assembly may be used as desired. In practice, the connection bracket 18 will normally be disposed in hidden relation behind the headliner 12.

Referring to FIGS. 3-5, details of an exemplary hook module 16 may be seen. As shown, in the illustrated exemplary embodiment, the hook module 16 includes the hook element 14, a backing structure 28 including forwardly projecting pivot arms 30 adapted to engage the hook element 14 and a shroud 32 adapted for disposition about the hook element 14 and pivot arms 30. The shroud 32 is also adapted to lockingly secure the backing 28 and hook element 14 in place relative to the shroud 32.

As best seen through joint reference to FIGS. 3, 5 and 9, in the exemplary embodiment the hook element 14 includes a pair of upwardly extending lobed ears 34 each of which includes a seating depression 36 in the form of a cavity (only one shown). In practice, the seating depressions 36 are adapted to receive and retain opposing raised boss features 38 (only one shown) that project inwardly from interior surfaces of the pivot arms 30. Specifically, as the ears 34 of the hook element 14 are pressed into place between the pivot arms 30, the pivot arms will flex outwardly and will then snap inwardly as the raised boss features 38 enter the corresponding seating depressions 36. In this arrangement, the hook element is secured in place relative to the backing 28 but can nonetheless be rotated about an axis of rotation substantially aligned with the seating depressions 36 and boss features 38.

In the illustrated arrangement, the backing structure 28 includes a back plate 39 having a pass-through opening 40 in the form of a slot adapted to receive and retain a compressible latching post 42 projecting rearwardly from an interior wall 44 (FIG. 5) of the shroud 32. As best seen in FIG. 5, the exemplary latching post 42 is of a generally board-like, planar configuration with an arrangement of outwardly projecting surface teeth 46 extending away from at least one lateral edge. Compression slots 48 extend partially along the length of the latching post 42. The surface teeth 46 have a height such that they normally obstruct passage of the latching post 42 through the pass-through opening 40. However, upon application of a sufficient insertion force, the latching post 42 may compress inwardly in a resilient manner with the compression slots becoming narrower. The distance between the surface teeth is slightly greater than the thickness of the backing plate 39 surrounding the pass through opening 40. Thus, as each surface tooth moves past the pass-through opening 40, the compression within the latching post 42 is relieved thereby causing the surface teeth 46 to rebound into a blocking orientation relative to the pass through opening 40. Accordingly, the latching post 42 moves in a ratcheting relation through the pass through opening 40.

As illustrated, in the exemplary embodiment a tower connection including a pair of opposing snap-fit insertion heads 50 extend rearwardly away from the backing plate 29 on either side of the pass-through opening 40. As best seen in FIGS. 7 and 8, the insertion heads 50 are adapted for snap-in locking relation behind rearwardly facing ledge surfaces 52 (only one shown) defined by the forward edges of cut-outs 54 on the lateral sides of the connection bracket 18. Specifically, each of the insertion heads 50 has a generally half arrowhead profile including a diverging, angled flexible wing segment 56 (only one shown). The wing segments 56 are normally disposed slightly outboard from the side edges of the backing plate 29. The wing segments 56 flex inwardly as they contact the inner walls of the connection bracket 18 during insertion of the backing 28. The wing segments 56 then snap behind the ledge surfaces 52 once the insertion operation is complete. In this relation, the backing structure 28 and attached elements are secured in place relative to the connection bracket 18.

As best seen through joint reference to FIGS. 5 and 8, in the exemplary embodiment, the backing structure 28 includes a grooved spacing post 60 extending rearwardly away from the back plate 39. The spacing post 60 includes a raised step 62 at the distal end with a groove 64 extending generally between the back plate 39 and the raised step 62. The groove 64 is aligned with a notch opening 66 at an upper edge of the back plate 39. In the assembly operation, the spacing post 60 acts to define a stop surface for initial assembly and insertion of the hook module 16.

As best seen through joint reference to FIGS. 3 and 4, the shroud 32 includes a standoff post 70 extending rearwardly in generally parallel relation to the latching post 42. During preassembly of the hook module 16, the standoff post 70 is extended through the notch opening 66 and along the groove 64. As will be appreciated, insertion of the latching post 42 through the pass-through opening 40 proceeds until the distal end of the insertion post reaches the raised step 62. That is, the latching post 42 may be inserted to a limited degree such that one or more of the surface teeth 46 are moved through the pass-through opening 40 while other teeth have not been passed through the opening. In this preassembled first latched condition shown in FIG. 4, all the components of the hook module 16 are held together. Thus, the hook module 16 may be shipped and handled as a modular unit.

According to the preferred practice, the hook module 16 is preassembled as a modular unit (FIG. 4) which may then be inserted into the connection bracket 18 which has been previously connected to the support structure prior 26. The headliner 12 is thus clamped between a forward flange 72 on the connection bracket 18 and a radial collar 74 on the shroud 32 (FIG. 6). As noted previously, upon insertion of the hook module 16 into the connection bracket 18, the snap fit insertion heads 50 extending away from the back plate 39 snap behind the ledge surfaces 52 at the connection bracket 18. As best seen through joint reference to FIGS. 5 and 8, in the exemplary embodiment the distal end of the grooved spacing post 60 will contact a camming surface 78 within the connection bracket 18 during the insertion procedure. As will be appreciated, as the hook module 16 continues to be pressed inwardly, the grooved spacing post will ride along the camming surface 78 thereby causing it to move rearwardly and to bend downwardly. As will be understood, the rearward movement of the spacing post takes place in conjunction with the concurrent rearward movement of the back plate 39 until full insertion of the snap-fit insertion heads 50 is achieved.

In the exemplary embodiment, the bending action of the grooved spacing post 60 during the rearward movement eventually causes the raised step 62 to move out of blocking engagement with the insertion post 70. With the raised step 62 out of the way, both the locking post 48 and the insertion post 70 may be further advanced. This advancement of the locking post 48 causes additional ratcheting of the locking post 48 through the pass through opening 40 thereby locking the components of the hook module 16 in a final latched condition. Moreover, the distal portion of the locking post 48 that extends through the pass through opening 40 acts to spread the snap-fit insertion heads 50 away from one another to aid in maintaining the final locked condition.

In the exemplary construction, the hook element 14 is held between the pivot arms 30 without the need for additional pivot pins or springs to prevent the hook element from unintentionally rotating from a closed to an open condition. Rather, the hook element is held in place substantially by a press-fit relationship. In this regard, in the exemplary construction each of the ears 34 on the hook element 14 includes a ramp feature 80 (FIG. 9) adapted to guide the boss feature 38 into the corresponding seating depression 36 to achieve the coaxial rotatable relation described previously.

In order to provide controlled rotation of the hook element 14 between open and closed conditions, each of the ears 34 preferably includes a first raised surface structure 82 and a second raised surface structure 84 disposed at different circumferential positions radially outboard from the seating depression 36. As shown in FIGS. 10 and 11, the pivot arms 30 each include a surface depressions 86 with adjacent raised platform surfaces 88 disposed radially outboard from the boss feature 38. In operation, as the hook element 14 is rotated between the open position and the closed position, the raised platform surfaces 88 act to interfere with movement of the first raised surface structure 82 and a second raised surface structure 84. However, once the desired open or closed position is achieved, the raised surface structures 82, 84 on the ears of the hook element 14 are outside the boundaries of the raised platform surfaces 88 and will reside within corresponding surface depressions 86. Thus, as the hook element is rotated away from the open or closed position, an initial additional force is required to move the surface structures 82, 84 past the blocking raised platform surfaces 88. Upon reaching the full open or closed position, the surface structures 82, 84 will then fall into the corresponding surface depressions 86 and will remain stable until a sufficient displacement force is applied. Thus, the hook element 14 is prevented from flopping out of position.

Of course, variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. the claims are to be construed to include alternative embodiments and equivalents to the extent permitted by the prior art.

Various features of the invention are set forth in the following claims.

What is claimed is:

1. A support hook retention system adapted for disposition in embedded relation within a vehicle headliner, the retention system comprising:
   a connection bracket including at least one outwardly projecting snap-fit connector adapted to lockingly engage a support structure at a position behind the headliner, the connection bracket having an acceptance opening facing outwardly away from the support structure, the acceptance opening defining an entranceway to an interior containment cavity; and
   a hook module including a forward portion adapted for disposition in front of the headliner and a rear portion of reduced diameter relative to the forward portion, the rear portion being adapted for mating insertion through an opening in the headliner and into the containment cavity, the hook module including a hook element held in pivoting relation to a backing structure, wherein the backing structure includes at least one rearwardly projecting snap-fit male connector adapted to lockingly engage a ledge surface at the connection bracket rearward of the acceptance opening, and wherein the hook module further includes a shroud adapted for disposition at least partially about the hook element, the shroud including a rearwardly projecting latching post adapted for staged insertion through a pass-through opening in a backing plate at the backing structure, the latching post including a pattern of outwardly extending raised surfaces such that the latching post is insertable through the pass-through opening between a first latched condition wherein the backing plate is held in place at a first distance from the shroud to at least a second latched condition wherein the backing plate is held in place at a second distance closer to the shroud.

2. The support hook retention system as recited in claim 1, wherein the snap-fit connector projecting outwardly from the connection bracket is a male tower connector comprising a pair of opposing snap-fit insertion heads, each including a resilient angled wing segment.

3. The support hook retention system as recited in claim 1, wherein the snap-fit connector projecting rearwardly from the backing structure in the hook module is a male tower connector comprising a pair of opposing snap-fit insertion heads, each including a resilient angled wing segment.

4. The support hook retention system as recited in claim 3, wherein the connection bracket includes sidewall cutouts, and wherein edges of the cut-outs define ledge surfaces adapted to engage wing segments of the snap-fit connector projecting rearwardly from the backing structure in the hook module.

5. The support hook retention system as recited in claim 1, wherein a pair of resilient pivot arms extends forward from the backing plate, the pivot arms being adapted to cooperatively clamp the hook element in rotatable relation between the pivot arms.

6. The support hook retention system as recited in claim 5, wherein the hook element includes a pair of ears extending away from an inner surface of the hook element, each of the ears including an interior seating depression, and wherein each of the pivot arms includes at least one boss member projecting away from an inner surface of the pivot arm, said at least one boss member being adapted for disposition within a corresponding seating depression at one of the ears.

7. The support hook retention system as recited in claim 6, wherein each of the ears includes a guide ramp disposed between the interior seating depression and the perimeter of the ear, the guide ramp defining a support surface for guiding said at least one boss member into the interior seating depression.

8. The support hook retention system as recited in claim 7, wherein the ears each include a pattern of circumferentially spaced raised surfaces adapted to engage corresponding depressions at the pivot arms when the hook is in the open and closed positions.

9. The support hook retention system as recited in claim 1, wherein the snap-fit connector projecting rearwardly from the backing structure in the hook module is a male tower connector comprising a pair of opposing snap-fit insertion heads, and wherein the pass-through opening in the backing plate is substantially aligned with the male tower connector such that the latching post is disposed in spreading relation between the snap-fit insertion heads following insertion through the pass-through opening to the second latched condition.

10. A support hook retention system adapted for disposition in embedded relation within a vehicle headliner, the retention system comprising:
    a connection bracket including at least one outwardly projecting snap-fit connector adapted to lockingly engage a support structure at a position behind the headliner, the connection bracket having an acceptance opening facing outwardly away from the support structure, the acceptance opening defining an entranceway to an interior containment cavity; and
    a hook module including a forward portion adapted for disposition in front of the headliner and a rear portion of reduced diameter relative to the forward portion, the rear portion being adapted for mating insertion through an opening in the headliner and into the acceptance opening at the connection bracket for locking retention within the containment cavity, the hook module including a hook element held in pivoting relation to a backing structure, wherein the backing structure includes at least one rearwardly projecting snap-fit male connector adapted to lockingly engage a ledge surface at the connection bracket rearward of the acceptance opening, and wherein the hook module further includes a shroud adapted for disposition at least partially about the hook element, the shroud including a rearwardly projecting latching post adapted for insertion through a pass-through opening in a backing plate at the backing structure, the latching post including a plurality of outwardly extending ratchet teeth disposed along the length of the latching post, and at least one compression slot disposed at the interior of the latching post, such that the latching post is insertable in compressible ratcheting relation through the pass-through opening between a first latched condition wherein the backing plate is held in place at a first distance from the shroud to at least a second latched condition wherein the backing plate is held in place at a second distance closer to the shroud.

11. The support hook retention system as recited in claim 10, wherein the snap-fit connector projecting rearwardly from the backing structure in the hook module is a male tower connector comprising a pair of opposing snap-fit insertion heads, and wherein the pass-through opening in the backing plate is substantially aligned with the male tower connector such that the latching post is disposed in spreading relation between the snap-fit insertion heads following insertion through the pass-through opening to the second latched condition.

12. The support hook retention system as recited in claim 11, wherein the connection bracket includes sidewall cutouts, and wherein edges of the cut-outs define ledge surfaces adapted to engage wing segments of the snap-fit connector projecting rearwardly from the backing structure in the hook module.

13. The support hook retention system as recited in claim 10, wherein a pair of resilient pivot arms extends forward from the backing plate, the pivot arms being adapted to cooperatively clamp the hook element in rotatable relation between the pivot arms and wherein the hook element includes a pair of ears extending away from an inner surface of the hook element, each of the ears including an interior seating depression, and wherein each of the pivot arms includes at least one boss member projecting away from an inner surface of the pivot arm, said at least one boss member being adapted for disposition within a corresponding seating depression at one of the ears.

14. The support hook retention system as recited in claim 13, wherein each of the ears includes a guide ramp disposed between the interior seating depression and the perimeter of the ear, the guide ramp defining a support surface for guiding said at least one boss member into the interior seating depression, each of the ears further including a pattern of circumferentially spaced raised surfaces adapted to engage corresponding depressions at the pivot arms when the hook is in the open and closed positions.

15. A support hook retention system adapted for disposition in embedded relation within a vehicle headliner, the retention system comprising:
  a connection bracket including at least one outwardly projecting snap-fit connector adapted to lockingly engage a support structure at a position behind the headliner, the connection bracket having an acceptance opening facing outwardly away from the support structure, the acceptance opening defining an entranceway to an interior containment cavity; and
  a hook module including a forward portion adapted for disposition in front of the headliner and a rear portion of reduced diameter relative to the forward portion, the rear portion being adapted for mating insertion through an opening in the headliner and into the acceptance opening at the connection bracket for locking retention within the containment cavity, the hook module including a hook element held in pivoting relation to a backing structure, wherein the backing structure includes at least one rearwardly projecting snap-fit male connector adapted to lockingly engage a ledge surface at the connection bracket rearward of the acceptance opening upon insertion of the hook module, and wherein the hook module further includes a shroud disposed at least partially about the hook element, the shroud including a rearwardly projecting latching post adapted for insertion through a pass-through opening in a backing plate at the backing structure, the latching post including a plurality of outwardly extending ratchet teeth disposed along the length of the latching post, and at least one compression slot disposed at the interior of the latching post, such that the latching post is insertable in compressible ratcheting relation through the pass-through opening between a first latched condition wherein the backing plate is held in place at a first distance from the shroud to at least a second latched condition wherein the backing plate is held in place at a second distance closer to the shroud, wherein a spacing post including a distal step extends rearwardly away from the backing plate, and wherein a standoff post extends rearwardly from the shroud, the standoff post being disposed in juxtaposed relation to the spacing post with the distal step in blocking relation to a distal end of the standoff post when the latching post is at the first latched condition.

16. The support hook retention system as recited in claim 15, wherein the connection bracket includes an internal camming surface disposed in substantial alignment with the travel path of the spacing post during insertion of the hook module into the connection bracket, such that upon contacting the camming surface, the distal end of the spacing post is bent away from the standoff post and the distal step is removed from blocking relation to the distal end of the standoff post, such that the standoff post is disposed over the distal step in the second latched condition.

17. The support hook retention system as recited in claim 16, wherein the spacing post includes a surface groove, and wherein the standoff post is substantially aligned with the surface groove.

18. The support hook retention system as recited in claim 15, wherein the snap-fit connector projecting rearwardly from the backing structure in the hook module is a male tower connector comprising a pair of opposing snap-fit insertion heads, and wherein the pass-through opening in the backing plate is substantially aligned with the male tower connector such that the latching post is disposed in spreading relation between the snap-fit insertion heads following insertion through the pass-through opening to the second latched condition.

19. The support hook retention system as recited in claim 15, wherein a pair of resilient pivot arms extends forward from the backing plate, the pivot arms being adapted to cooperatively clamp the hook element in rotatable relation between the pivot arms and wherein the hook element includes a pair of ears extending away from an inner surface of the hook element, each of the ears including an interior seating depression, and wherein each of the pivot arms includes at least one boss member projecting away from an inner surface of the pivot arm, said at least one boss member being adapted for disposition within a corresponding seating depression at one of the ears.

20. The support hook retention system as recited in claim 19, wherein each of the ears includes a guide ramp disposed between the interior seating depression and the perimeter of the ear, the guide ramp defining a support surface for guiding said at least one boss member into the interior seating depression, each of the ears further including a pattern of circumferentially spaced raised surfaces adapted to engage corresponding depressions at the pivot arms when the hook is in the open and closed positions.

* * * * *